United States Patent
Wong (10) Patent No.: US 12,379,495 B2
(45) Date of Patent: *Aug. 5, 2025

(54) THREE-DIMENSIONAL HYPERSPECTRAL IMAGING SYSTEMS AND METHODS USING A LIGHT DETECTION AND RANGING (LIDAR) FOCAL PLANE ARRAY

(71) Applicant: Northrop Grumman Systems Corporation, Falls Church, VA (US)

(72) Inventor: Chung Ming Wong, Redondo Beach, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 231 days.

This patent is subject to a terminal disclaimer.

(21) Appl. No.: 18/129,157

(22) Filed: Mar. 31, 2023

(65) Prior Publication Data

US 2023/0305147 A1  Sep. 28, 2023

Related U.S. Application Data

(60) Division of application No. 16/777,212, filed on Jan. 30, 2020, now Pat. No. 11,681,045, which is a
(Continued)

(51) Int. Cl.
| | |
|---|---|
| *G01S 17/08* | (2006.01) |
| *G01J 3/02* | (2006.01) |
| *G01J 3/28* | (2006.01) |
| *G01J 3/44* | (2006.01) |
| *G01S 7/48* | (2006.01) |

(Continued)

(52) U.S. Cl.
CPC ............ *G01S 17/08* (2013.01); *G01J 3/0278* (2013.01); *G01J 3/2803* (2013.01); *G01J 3/2823* (2013.01); *G01J 3/4406* (2013.01); *G01S 7/4802* (2013.01); *G01S 7/4814* (2013.01);
(Continued)

(58) Field of Classification Search
None
See application file for complete search history.

(56) References Cited

U.S. PATENT DOCUMENTS

| | | | |
|---|---|---|---|
| 7,227,116 B2 * | 6/2007 | Gleckler | G01N 21/6408 250/214 VT |
| 7,760,334 B1 * | 7/2010 | Evans | G01S 7/4802 356/141.5 |

(Continued)

*Primary Examiner* — Luke D Ratcliffe
(74) *Attorney, Agent, or Firm* — KLINTWORTH & ROZENBLAT LLP (57) ABSTRACT

A system having an illumination source configured to illuminate a target object using broadband laser light. A dispersive element is configured to spectrally separate light received from the target object into different colors A focal plane array (FPA) is configured to: (1) receive the light from the dispersive element; (2) acquire spatial information regarding the target object in one dimension in the plane of the FPA; acquire spectral information in a second dimension in the plane of the FPA, wherein the second dimension is perpendicular to the first dimension; (4) obtain information regarding a distance from the FPA to the target object by obtaining different times of flight of at least two wavelengths; and (5) detect a single photon of light, thereby hyperspectrally imaging the target object in three dimensions.

17 Claims, 7 Drawing Sheets

Related U.S. Application Data division of application No. 15/209,106, filed on Jul. 13, 2016, now Pat. No. 10,605,918, which is a continuation of application No. 13/628,126, filed on Sep. 27, 2012, now Pat. No. 9,448,110.

(51) Int. Cl.
  *G01S 7/481* (2006.01)
  *G01S 7/4863* (2020.01)
  *G01S 17/42* (2006.01)
  *G01S 17/89* (2020.01)

(52) U.S. Cl.
  CPC ............ *G01S 7/4816* (2013.01); *G01S 17/42* (2013.01); *G01S 17/89* (2013.01); *G01S 7/4863* (2013.01)

(56) References Cited

U.S. PATENT DOCUMENTS

| | | | |
|---|---|---|---|
| 2005/0068517 A1* | 3/2005 | Evans | G01J 3/10 356/141.5 |
| 2005/0151965 A1* | 7/2005 | Bissett, III | G01J 3/2823 356/73 |
| 2011/0101239 A1* | 5/2011 | Woodhouse | G01S 7/4802 356/51 |

* cited by examiner

Intensity Images

THREE-DIMENSIONAL HYPERSPECTRAL IMAGING SYSTEMS AND METHODS USING A LIGHT DETECTION AND RANGING (LIDAR) FOCAL PLANE ARRAY

CROSS REFERENCE TO RELATED APPLICATIONS

The present application is a divisional application of U.S. patent application Ser. No. 16/777,212, filed Jan. 30, 2020, entitled "THREE-DIMENSIONAL HYPERSPECTRAL IMAGING SYSTEMS AND METHODS USING A LIGHT DETECTION AND RANGING (LIDAR) FOCAL PLANE ARRAY", which is a divisional application of U.S. patent application Ser. No. 15/209,106, filed Jul. 13, 2016 (now U.S. Pat. No. 10,605,918, issued Mar. 31, 2020), entitled "THREE-DIMENSIONAL HYPERSPECTRAL IMAGING SYSTEMS AND METHODS USING A LIGHT DETECTION AND RANGING (LIDAR) FOCAL PLANE ARRAY", which is a continuation application of U.S. patent application Ser. No. 13/628,126, filed Sep. 27, 2012 (now U.S. Pat. No. 9,448,110, issued Sep. 20, 2016), entitled "THREE-DIMENSIONAL HYPERSPECTRAL IMAGING SYSTEMS AND METHODS USING A LIGHT DETECTION AND RANGING (LIDAR) FOCAL PLANE ARRAY", the entire contents of which are incorporated herein by reference.

BACKGROUND

The invention relates generally to three-dimensional imaging systems and methods and more particularly to three-dimensional hyperspectral imaging systems and methods using a light detection and ranging (LIDAR) focal plane array.

SUMMARY

In certain embodiments a system includes an illumination source configured to illuminate a target object using broadband laser light; a dispersive element configured to spectrally separate light received from the target object into different colors; and a focal plane array (FPA) configured to receive the light from the dispersive element, configured to acquire spatial information regarding the target object in one dimension in the plane of the FPA, configured to acquire spectral information in a second dimension in the plane of the FPA, wherein the second dimension is perpendicular to the first dimension, configured to obtain information regarding a distance from the FPA to the target object by obtaining different times of flight of at least two wavelengths, and configured to detect a single photon of light, thereby hyperspectrally imaging the target object in three dimensions.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Multi-sensor data can be fused together to increase probability of automatic target recognition. Spectral 3D imaging light detection and ranging (LIDAR) have been demonstrated using the multiple slit streak tube imaging LIDAR (STIL) for only a few wavelengths. In a monochromatic STIL technique, a laser pulse source reformatted to a line illuminates a target and the returning light pulse is received and directed toward a photocathode with a slit. The received light pulse is converted to electrons. Plates with ramping potential sweep the fan of electrons onto a phosphor anode. The time of return of the laser pulse is determined using the location of the electrons on the phosphor anode. The light signal from the anode is collected by a charge-coupled device (CCD) array. A STIL system, however, requires some prior knowledge of the location of an object. Moreover, permissible variations in range within a scene are limited by the size of the CCD. Prior knowledge of the target range cannot be easily gained using solely the STIL system. In addition, it is impractical to create a 3D hyperspectral imaging system which will require too many slits for the STIL system.

Fused data sets derived from combining hyperspectral and LIDAR data provide opportunities to measure the structure of a target in three-dimensions as well as classifying the materials that constitute the object. These types of data sets have been used for forest inventory, global monitoring of deforestation events, and urban structure monitoring. Such fused data sets are commonly created from hyperspectral and LIDAR data sets taken at different times. Accordingly, the possibility that objects may have moved in between the creation of data sets can impact the data's usefulness, especially for dynamic urban scenes. In addition to such simultaneity issues, the hyperspectral and LIDAR sensors often have one or more of different array formats, different ground sample distances (GSD), and different perspectives on the target of interest. These differences made the data fusion process and its automation non-trivial.

As a result, data processing often takes up a large amount of resources in the data product cycle and requires significant human intervention to resample the data and spatially overlapping them. Although designing and flying a combined instrument may reduce the complexity in producing fused data products, the hyperspectral imager—being a passive instrument—only collects data at times of day when the Sun is near its nadir. Moreover, tall objects, such as buildings and trees, can cast shadows, thereby creating holes in the hyperspectral images.

Embodiments of the invention provide a three-dimensional (3D) hyperspectral imaging system and method capable of providing three dimensional spatial information, a target's spectral signature on at least one point, and temporal information on an emission induced by a laser pulse.

According to embodiments of the invention, a broadband pulsed laser source may be spatially reformatted into a line illumination on a target object that is imaged across the spatial dimension on the FPA with m picture elements or pixels. The spectral information from these m pixels is recorded along the spectral dimension on the FPA, which has n pixels. At least one of the m by n pixels is capable of recording the time-of-flight of the return laser pulse and multiple times-of-flight for pixels that see multiple layers.

According to embodiments of the invention, temporal information on the laser-pulse-induced emission may be observed by the time-of-flight (TOF) measurement of the return laser pulse. According to further embodiments of the invention, the temporal information may make it possible to measure the lifetime of the excitation state of the target material.

According to embodiments of the invention, a target object may be illuminated by laser light. According to further embodiments of the invention, objective optical element may receive the light returning from the object. The returning light may, according to embodiments of the invention, be focused through a split that spatially filters the returning light into an array with m elements.

According to other embodiments of the invention, additional optics may collimate the light onto a dispersive element to spectrally spread the light into n different wavelength bins. According to still further embodiments of the invention, the spectrally dispersed light may then be directed and refocused upon an m-by-n light detection and ranging (LIDAR) focal plane array (FPA).

According to embodiments of the invention, the system can be operated in push-broom mode on an aircraft that scans the target.

According to further embodiments of the invention, at least one pixel comprised in the 3D LIDAR FPA independently counts time to measure the TOF of the reflected laser pulse. The spatial profile of the laser source is reformatted to a single line and matched to the field of view in the spatial dimension of the FPA in order to optimize target illumination. The laser source may comprise a wide spectral bandwidth laser.

Embodiments of the invention provide an instrument that can map a target in three dimensions. Embodiments of the invention provide an instrument that can measure the spectral information of a target. Embodiments of the invention provide an instrument that can map a target in three dimensions while simultaneously measuring its spectral information.

Embodiments of the invention can measure the excited state lifetime of the target material after excitation by a laser pulse.

Embodiments of the invention can measure a target hidden beneath canopies and acquire 3D information regarding the object and spectral information for at least one 3D point. Thus, it is capable of 3D hyperspectral foliage penetration by gating out the layers that are obscuring the intended target According to embodiments of the invention, two systems and methods are presented for using a LIDAR focal plane array.

According to embodiments of the invention, the system may operate at a low repetition rate with high pulse energy. According to these embodiments, the FPA is configured to detect multiple photons.

According to embodiments of the invention, the FPA may be configured to detect a single photon.

According to embodiments of the invention, at least two detections may be performed, and the at least two detections may be used to construct a histogram representing the spectral reflectivity of the target object.

Figure 1:
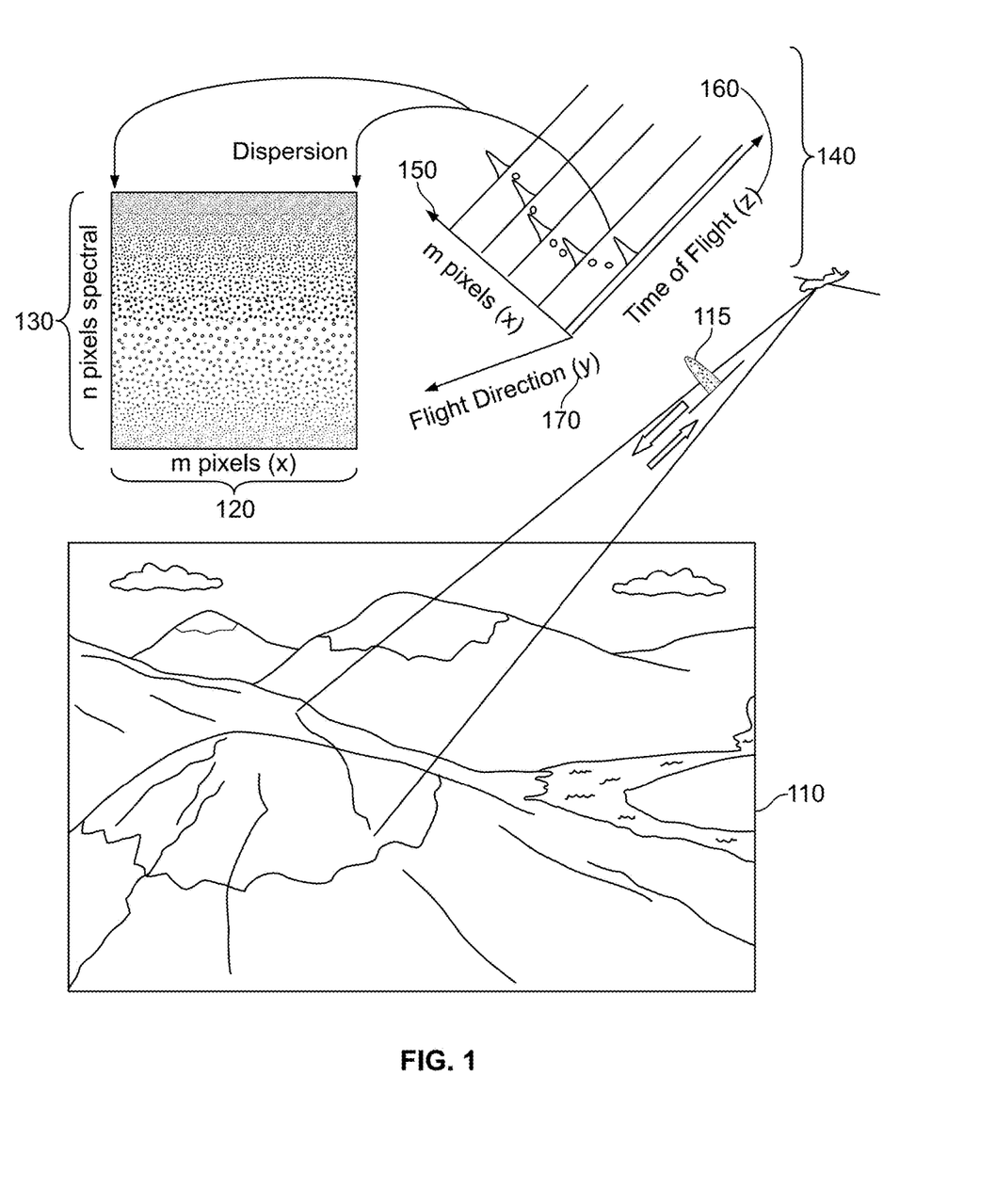
FIG. 1 is a schematic illustration of a three-dimensional (3D) hyperspectral imaging system using a LIDAR focal plane array.

FIG. 1 is a schematic illustration of a 3D hyperspectral imager using a LIDAR focal plane array. In order to produce a three-dimensional image of a target scene 110 as well as spectral information, a broadband pulsed laser source 115 is spatially reformatted into a line illumination across m pixels 120 on a target 110 that is imaged across the spatial dimension on the FPA. The spectral information from these m pixels is recorded along the spectral dimension on the FPA, which has n pixels 130. The n pixels 130 have different wavelengths corresponding to their different positions along the vertical or spectral axis. At least one of the m by n pixels is capable of recording the time-of-flight of the return laser pulse. Pixels that see multiple layers are capable of recording multiple times-of-flight.

The image width and length of this line illumination may be closely matched to the field of view of the sensor for best performance. Although the laser beam profile can serve as a spatial filter, it is preferable to use a slit to limit the amount of background noise. An optical element, such as a diffraction grating or a prism, disperses and separates the return laser pulse 115 into different colors along the spectral direction of the focal plane array 140. A set of focusing optics refocuses the collimated light onto the focal plane array. Having the light dispersed by a grating or a prism and being on different parts of the target 110 along the x axis, the light pulses returned from the step target that are collected by the focusing optics will land on different parts of the focal plane array 140 along the spatial and spectral directions and at different times. By its ability to measure time-of-flight of a return pulse for each picture element on the LIDAR focal plane array 140, the system acquires spatial information along the x axis 150 and the z axis 160 along with spectral information for at least one picture element through at least one laser flash. Upon scanning the system along the y axis 170 in a push broom operational mode, spatial information of the target 110 for three spatial dimensions can be gathered as well as spectral information for each picture element. The spectral bandwidth can be determined by the array size and the dispersive element. Accordingly, a scene 110 can be imaged in three dimensions, x, y, and z. Spectral information is gathered for these 3D data points.

Imaging systems that use a LIDAR FPA can perform 3D imaging of an entire scene in a single laser flash. For applications where the target is moving at a very high speed, such systems essentially freeze the object in its trajectory at the instant of a single laser flash.

Instead of using the LIDAR camera to image an entire scene in a single laser flash, according to embodiments of the invention, a slit and a dispersive element can be placed in the optical path to convert the camera into a 3D hyperspectral imager.

The spatial profile of the laser source must be reformatted to a single line and matched to the field of view in the spatial dimension of the FPA so that the illumination of the target is optimized. To measure the spectral reflectance signature of a target and to map the target in three dimensions, the laser must have a wide enough spectral band to cover the spectral region of interest. For example, a wide spectral source can be used to measure the health of trees since dry leaves have markedly different spectral reflectance in the near infrared while at the same time map out the leave density in 3D. In addition, embodiments of the invention may be used in pump-probe techniques that can increase specificity and provide higher accuracy in chemical identification that is often obscured by spectral interference from surrounding chemical species.

Figure 2:
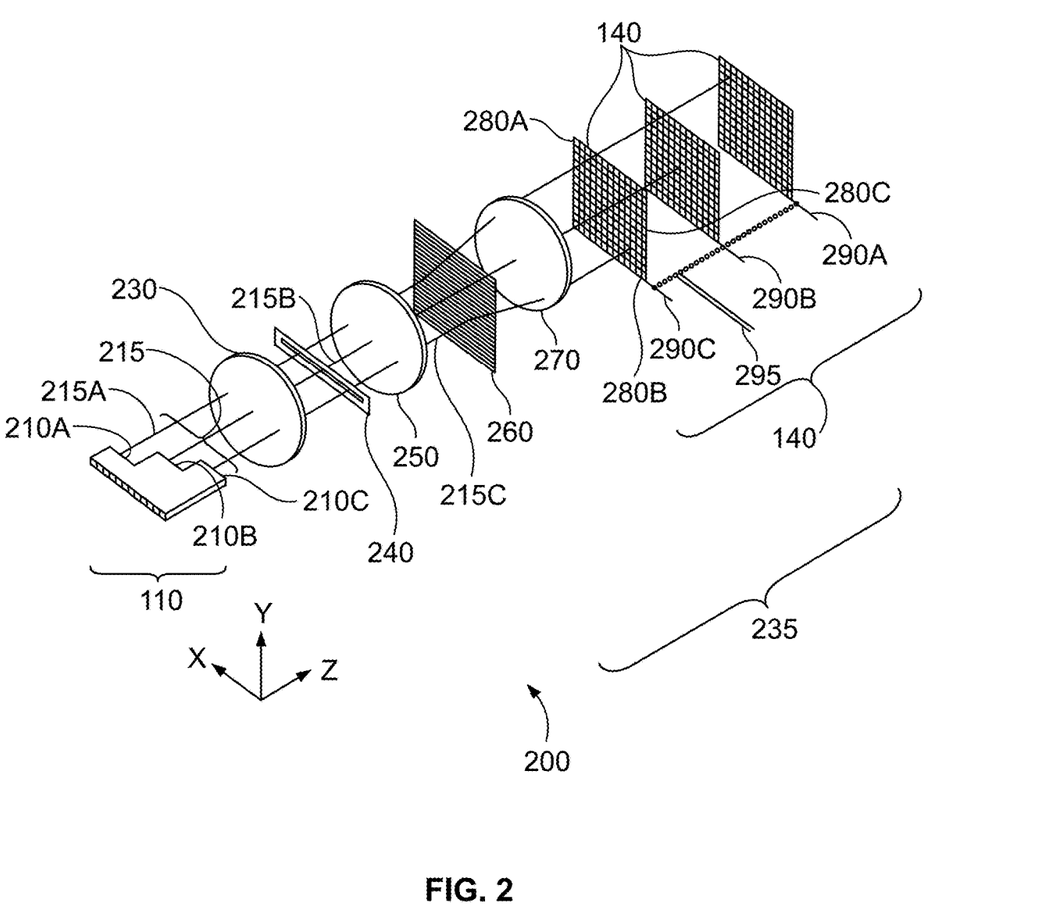
FIG. 2 is a drawing showing an overview of a 3D hyperspectral imaging system using a LIDAR focal plane array (FPA).

FIG. 2 is a drawing showing an overview of a 3D hyperspectral imaging system to image a target 110 using a LIDAR focal plane array (FPA) 140.

The illumination source (not shown) can comprise a laser source with a wide spectral bandwidth. For example, a broadband laser source can be used with a pulse width on the order of a few nanoseconds. To measure the spectral reflectance signature of a target 110 and to map the target 110 in three dimensions, the illumination source must have a wide enough spectral band to cover the spectral region of interest. For example, the illumination source may be a commercial off-the-shelf (COTS) broadband Koheras SuperK Compact Laser from NKT Photonics (formerly Koheras A/S) of Copenhagen, Denmark. This laser system, like most fiber lasers, operates at a high repetition rate with low pulse energy. Thus, according to embodiments of the invention, a single-photon sensitive LIDAR FPA with high frame rate can be used.

According to embodiments of the invention, the target object 110 is illuminated by a line of illumination. The spatial profile of the illumination source is reformatted to a single line and matched to the field of view in the spatial direction of the FPA 140 so that the illumination of the target 110 is optimized. The LIDAR focal plane array 140 samples the return signal after reflection by the target 110 at a sampling time interval of $\Delta t$.

As a simplified illustration, the target 110 in the schematic diagram is comprised of three step surfaces 210A, 210B, and 210C with reflectance at three different wavelengths of light to reflect a return pulse 215, comprising three component return pulses 215A, 215B, and 215C with corresponding paths of different lengths. The surface 210A that reflects $\lambda_1$ has the longest path 215A to the FPA 140, the surface 210B that reflects $\lambda_2$ has a path 215B of intermediate length to the FPA 140 and the surface 210C that reflects $\lambda_3$ has the shortest path 215C to the FPA 140. Component return pulse 215C reflected from the surface 210C that reflects $\lambda_3$ is detected at an earlier time $t_1$, component return pulse 215B from the surface 210B that reflects $\lambda_2$ is detected later at an intermediate time $t_2$, and component return pulse 215A from the surface 210A that reflects $\lambda_1$ is detected at a later time $t_3$.

The system 200 further comprises objective optical element 230 and a spectrometer 235. The spectrometer 235 comprises a spectrometer entrance 240, collimating optics 250, a dispersive element 260, and focusing optics 270.

The objective optical element 230 collects and focuses the line of illumination through the spectrometer entrance 240. The spectrometer entrance 240 may be a slit 240. The spectrometer entrance 240 spatially filters the line of illumination and defines a spatial line in the spatial dimension of the focal plane array 140. The collimating optics 250 collimates the light onto the dispersive element 260. The dispersive element 260 spreads the line of light in the spectral direction. For example, the dispersive element 260 may be one of a grating 260 and a prism 260. The focusing optics 270 then focuses the light onto the FPA 140. The spectrally dispersed light is incident on the m-by-n 3D LIDAR focal plane array 140.

The FPA 140 comprises an m-by-n array with pixels 280A, 280B, 280C, and so on that measures the profile of the component return pulses 215A-215C using time slices 290A-290C. The reflected component return pulses 215A, 215B, and 215C have different times-of-flight and are respectively detected in different time bins 290A, 290B, and 290C on the LIDAR focal plane array 140. Generally there will be an approximate fixed sampling time interval $\Delta t$ 295 between successive samples. The sampling interval $\Delta t$ 295 is usually on the order of a nanosecond. The time difference between the time $t_1$ at which time bin 290C is sampled and the time $t_2$ at which time bin 290B is sampled may be a large multiple of $\Delta t$. Similarly, the time difference between the time $t_2$ at which time bin 290B is sampled and the time $t_3$ at which time bin 290A is sampled may be a large multiple of $\Delta t$.

At least one of the pixels 280A, 280B, 280C and so on can be set to trigger independently, allowing target objects at vastly different ranges to be imaged in a single laser flash. Upon triggering, each pixel 280A, 280B, 280C uses its buffer to record a profile of the return pulse 215. In addition, each pixel 280A, 280B, 280C records the time of the triggering event, also known as the course time-of-flight (TOF) of the return pulse 215. The recorded profile of the return pulse 215 can help to determine the time-of-flight more accurately through curve fitting, centroiding, or other statistical methods. Accordingly, this technique avoids the limitation of the range resolution by the sampling interval that would otherwise occur. By using the measured course time-of-flight and the peak position of the return pulse profile from the time samples, the system can determine the locations of objects within a scene that may be very far apart from each other.

The readout integrated circuit (ROIC) (not shown) can be operated in two different modes, a threshold mode or a gated mode. In the threshold mode, each pixel on the ROIC starts to count time at the moment when the illumination source (not shown) fires a pulse. As soon as the return pulse 215 crosses a preset threshold on a particular pixel 280A, 280B, 280C, and so on, that pixel will sample the return pulse waveform and stops the clock after a ring buffer limit is reached. Since each pixel 280A, 280B, 280C, and so on triggers independently in the threshold mode, the system 200 has a large dynamic range in measuring widely varying TOF in a single scene.

In contrast, in the gated mode, the FPA 140 collects information regarding a single frame at a preset time. The gated mode requires some previous knowledge of the target range, but it is useful in systematically mapping the shape of a target object 110. The gated mode is also useful to determine one or more of the vertical atmospheric profile and the lifetime of an excited state for a target 110 that is relatively time invariant during data collection. Operating in the gated mode provides the opportunity to measure the fluorescence lifetime of a target 110. For fluorescence measurements, a single wavelength pulse laser is used to excite the target material and the system 200 then measures the return spectra as a function of time with a time sampling interval of $\Delta t$ 295. Knowledge of the target range can be gained by firing a single laser shot with the ROIC (not shown) operating in threshold mode and then reverting to the gated mode to accomplish the measurements.

The system 200 can be operated in a push-broom mode, for example, push-broom mode on an aircraft that scans the target. Whiskbroom mode is also possible, in which case an additional scanning mechanism is used.

The system 200 can also be mounted on top of a vehicle and configured to scan in 360 degrees so as to map 3D points and so as to acquire spatial and spectral information for 3D points surrounding the vehicle. Such embodiments may prove useful for situation awareness applications.

The system 200 was verified experimentally as able to measure spectral reflectance of a target and to determine its location in 3D space at a small spot. The time-of-flight of the return signal and the inherent spectrum of the broadband laser source were both simultaneously measured by the system 200.

Figures 3, 3A:
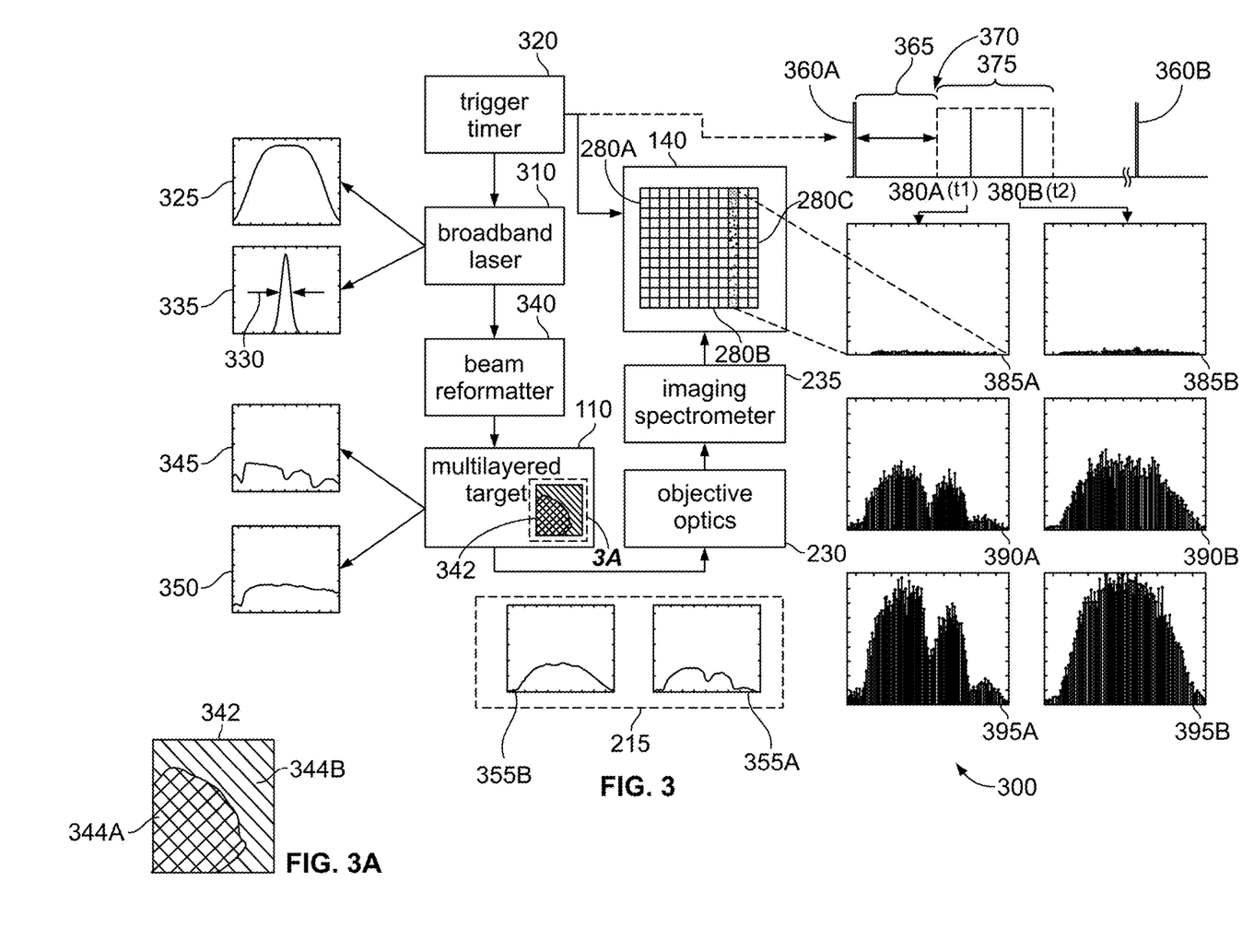
FIG. 3 is a schematic diagram of components of a 3D hyperspectral imaging system using a LIDAR focal plane array (FPA), showing corresponding modeled data for a multilayer target object, wherein the FPA is configured to detect a single photon.
FIG. 3A is a blown up view of a portion of FIG. 3 depicting a pixel.

FIG. 3 is a schematic diagram of components of a 3D hyperspectral imaging system using a LIDAR focal plane array (FPA) showing corresponding modeled data for a multilayer target object, wherein the FPA is configured to detect a single photon. FIG. 3A is a blown up view of a portion of FIG. 3 depicting a pixel.

The active 3D HSI system 300 uses a single-photon sensitive LIDAR focal plane array (FPA) 140 that operates in linear mode and at a frame rate on the order of tens of kilohertz. For long range applications, the number of photons returned per laser shot may be low. Accordingly, the spectrum of a ground pixel may be built up through many laser shots. This is feasible since both the laser 310 and the LIDAR FPA 140 can operate at a high repetition rate on the order of tens of kilohertz.

A trigger timer 320 synchronizes the laser source 310 and the LIDAR FPA 140. The laser source 310 will emit a spectral waveform 325 exhibiting a temporal pulse width 330 on the order of a nanosecond as indicated by the temporal waveform 335. The laser beam is then spatially reformatted by a beam reformatter 340 into a line illumination. The reformatted beam then propagates to the target object 110, whose pixel 342 comprises multiple layers, for example, layers 344A and 344B. The target object 110 may, for example, be a target object 110 comprising two substantially flat layers as in the example shown in FIG. 3 for illustration purposes. Real targets may have more complex layering. Top layer spectral reflectance waveform 345 and bottom layer spectral reflectance waveform 350 respectively indicate the spectral reflectance of the top layer and of the bottom layer of target object 110. The top layer spectral reflectance waveform 345 is a representative spectral reflectance waveform for healthy plant leaves, while the bottom layer spectral reflectance waveform 350 is a representative spectral reflectance waveform for dry plant leaves. The bottom layer spectral reflectance waveform 350 is relatively featureless compared to that of the top layer spectral reflectance waveform 345.

To simplify matters without a loss of generality, the following discussion will focus on the signal coming from a pixel 342 comprised in the target object 110, where the pixel 342 covers two layers 344A-344B. The signal from the pixel in target object 110 is detected by a column of device pixels comprised in the LIDAR FPA 140. As indicated by received spectral reflectance waveforms 215, the spectral return pulse will typically be approximately equal to the product of the spectrum of the laser 310 and the spectral reflectance of the target object 110 and the atmospheric transmission (not shown). As seen by the single pixel 342, the top layer of the target object 110 is closer to the FPA 140 and therefore typically returns a return signal at an earlier time $t_1$ 380A with a spectral profile as indicated by first received spectral reflectance waveform 355A. As seen by the single pixel 342, the bottom layer of the target object 110 is farther from the FPA 140 and therefore typically returns a spectral signal at a later time $t_2$ 380B with a spectral profile as indicated by second received spectral reflectance waveform 355B.

These return signals 215A-215C are collected by the objective optical element 230. Return signals 215A-215C comprise light pulses with temporal profiles approximately as indicated by the temporal waveform 335 for significantly thin layers. The imaging spectrometer 235 disperses the light across the LIDAR FPA 140 to separate out the spectral components and thereby separating a single pulse of light into many pulses of light with different center wavelengths along the spectral dimension of the FPA. For example, the spectrometer may comprise a COTS imaging spectrometer from HORIBA Instruments, Inc. of Santa Clara, California.

A column of detectors collects the return signal 215 for the single pixel 342. Pixels 280A, 280B, 280C, and so on comprised in the FPA 140 are synchronized by the trigger timer 320. The pixels 280A, 280B, 280C, and so on sample the return signal 215 within an acquisition window at a particular center wavelength. The trigger timer 320 issues one or more synchronization pulses 360A and 360B. To reduce the amount of unnecessary data and to prevent saturation of the detectors at the time of the laser shot, a time delay 365 is introduced between the trigger pulse 360A and the start time 370 when data acquisition begins. The duration of the data acquisition time window 375 during which data may be acquired is selected based on the expected distance between the closest and farthest objects 110 to be imaged.

Assuming that the target object 110 as seen by the pixel 342 comprises a plurality of layers 344A-344B, for example, a top layer 344A and a bottom layer 344B. The return signals 215 from the two layers will be respectively detected at two nearby times, at a first time 380A ($t_1$) for the top layer 344A and at a second time 380B ($t_2$) for the bottom layer 344B. More complex structures would cause the return signals 215 to spread in time with temporal centers close to the first time 380A for the top layer 344A and close to the second time 380B for the bottom layer 344B. Waveforms 355A and 355B respectively carry information regarding the top layer spectral reflectance waveform 345 and the bottom layer spectral reflectance waveform 350. The waveforms 355A and 355B are altered by the spectral waveform 325 and by atmospheric transmission.

Upon analysis of the atmospheric conditions and using the spectral waveform 325, the spectral reflectance of the top layer 344A and of the bottom layer 344B, respectively as indicated by the top and bottom spectral reflectance waveforms 345 and 350, may be derived. First waveforms 385A and 385B respectively represent histograms built up after a few laser shots for the top layer 344A and for the bottom layer 344B. Second waveforms 390A and 390B respectively represent histograms built up after half of the total number N of shots for the top layer 344A and for the bottom layer 344B. Third waveforms 395A and 395B respectively represent histograms built up after N shots for the top layer 344A and for the bottom layer 344B. While the preceding paragraphs of this example are applicable to embodiments in which multiple photons are detected, exemplary waveforms 385A, 385B, 390A, 390B, 395A, and 395B correspond to embodiments in which the FPA detects a single photon.

The spectrum is built up as a histogram as can be seen by reviewing the six waveforms 385A-385B, 390A-390B, and 395A-395B. By measuring the spectral return as a function of time for each ground pixel with the sensor moving and operating in a push-broom fashion, a three-dimensional (3D) image is acquired with spectral information for at least one 3D point.

Figure 4A:
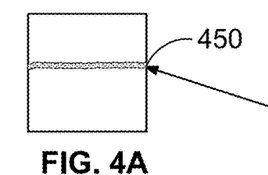
FIGS. 4A-4D are a set of intensity images acquired by a 3D hyperspectral imaging system using a LIDAR focal plane array, wherein the FPA is configured to detect multiple photons.

FIGS. 4A-4D are a set of intensity images acquired by a 3D hyperspectral imaging system using a 3D LIDAR focal plane array, wherein the imaging system is configured to detect multiple photons. The target comprises a graded spectralon panel having substantially uniform spectral reflectivity in the near infrared region, but with regions of gradually decreasing overall reflectivity. The images depict the brightest part of the panel and were obtained using as an illumination source 310 a monochromatic Big Sky laser manufactured by Quantel Technologies of France with a diffuser at its exit port and a broadband infrared laser source that has a spectral profile that spans across the near infrared region. The imaging spectrometer has a dispersive element that can be set to different angles to look at different spectral regions. Data acquisition using the Big Sky laser with a diffuser and using the broadband source as illumination source were not performed simultaneously. The images were taken using a single-pulse sampling flash LIDAR camera manufactured by Advanced Scientific Concepts (ASC) of Santa Barbara, California with its long pass filter removed. Images taken using the Big Sky laser with a diffuser form a narrow line that extends across the spatial x direction as shown in FIG. 4A and occurs at a wavelength of approximately 1574 nm.

Figure 4B:
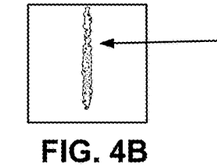
Figure 4C:
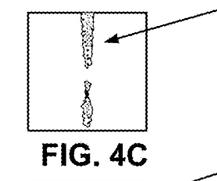
Figure 4D:
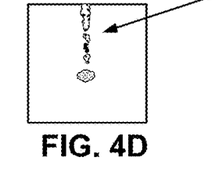

Since the spot size of the broadband illuminator covers approximately ten pixels, it reveals itself as a relatively thick line that extends along the spectral direction for different grating positions as shown in FIGS. 4B-4D. These data sets were taken with the dispersive element comprised in the imaging spectrometer set at different angles. The broadband source was not reformatted as a line due to lack of sensitivity of this FPA. A single-photon sensitive FPA would provide the necessary parameter to allow full demonstration of the current invention.

Figure 4E:
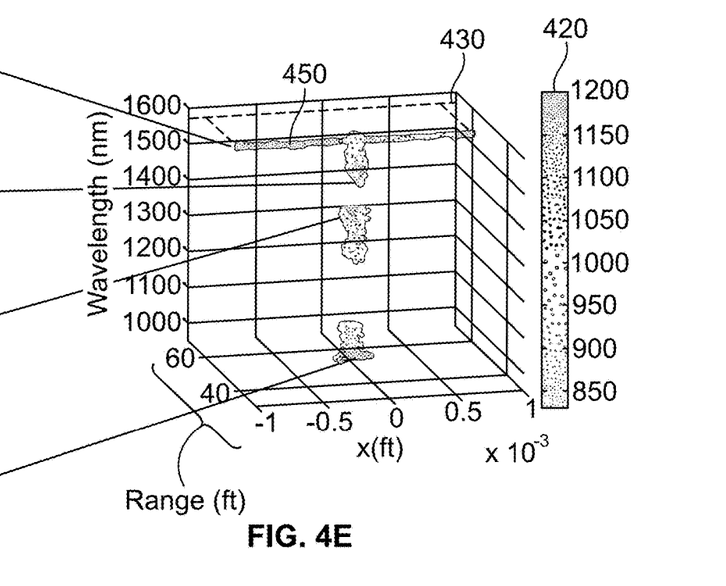
FIG. 4E is a schematic illustration of measurement of the range of the target (an "x-range-wavelength scatterplot") using time-of-flight information by a 3D hyperspectral imaging system using a LIDAR focal plane array.

FIG. 4E is a schematic illustration of measurement of the range of the target (an "x-range-wavelength scatterplot") using time-of-flight information by a 3D hyperspectral imaging system using a 3D LIDAR focal plane array. The intensity images depicted in FIGS. 4A-4D appear in this figure with digital counts indicated by the scale 420. The dotted line 430 shows the projection onto the wavelength axis of the intensity image 450 depicted in FIG. 4A, clarifying that the wavelength for this particular example is approximately 1574 nm. Since the target comprises a spectralon panel with uniform spectral reflectivity in the near infrared region, the variation in intensity along the spectral direction represents the spectrum of the broadband laser source. Using the time-of-flight information, embodiments of the invention can measure the range of the target. FIG. 4E plots the location of the target 110 in thousandths of feet along the x-axis, the range of the target 110 in feet along the z-axis, and along the vertical axis, the spectral reflectivity of the target 110 as a function of wavelength in nanometers. For a field system, the field of view and distance to the target could be expanded more than is indicated in this example. In addition, a dispersive element with lower dispersion may be used to cover a wider spectral region and improve signal-to-noise ratio.

Figure 4F:
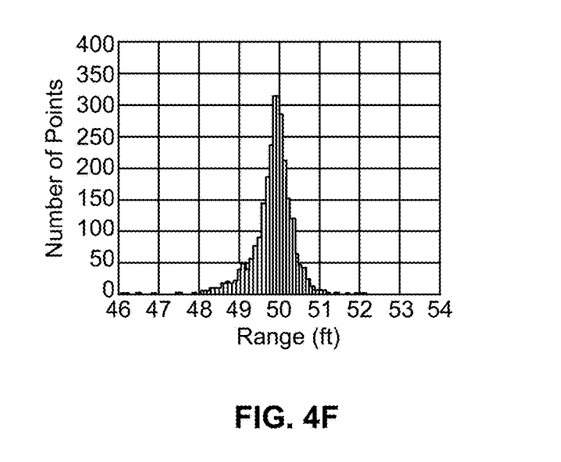
FIG. 4F is a histogram of range measurements for the data points comprised in FIGS. 4B-4D.

FIG. 4F is a histogram of range measurements for the data points comprised in FIGS. 4B-4D. The measured mean distance between the instrument and the flat spectralon panel was approximately 50 feet with a standard deviation of approximately 0.57 feet. The spread in the histogram is principally caused by detection statistics and residuals after correcting for a correlation between range and intensity. This correlation between range and intensity is an inherent problem with the particular LIDAR FPA used and is not inherent in the 3D hyperspectral imaging systems and methods according to embodiments of this invention. The distribution of range measurements for the data points comprised in FIG. 4A (not shown) has a slightly smaller standard deviation. Its spread is about 0.51 feet and is a result of a more uniform illumination produced by the diffuser at the laser output port. Range measurements for data points comprised in FIG. 4A are not included in FIG. 4F so that these data points will not skew the distribution of range measurements gathered by using the broadband laser source. The similar range resolutions for the data points acquired using these two laser sources demonstrate that the range-intensity correlation is independent of wavelength in the spectral region comprising the data points illustrated in FIG. 4B-4D. These results show that 3D hyperspectral imaging using a LIDAR FPA according to embodiments of the invention is highly feasible.

According to embodiments of the invention, using an m-by-n 3D LIDAR focal plane array, a dispersive optical element at the fore-optics of the imager, and a pulsed laser source, a 3D hyperspectral imaging system can provide a data product with three spatial dimensions, and hyperspectral information for acquired 3D points. These data product dimensions may also consist of spatial information, the spectral signature of a target, and temporal information on the emission induced by a laser pulse. The temporal information either provides a time-of-flight (TOF) measurement of the return laser pulse, which can simply be converted to the third spatial dimension, or a measure of the excitation state lifetime of the target material after excitation by a laser pulse.

Figure 5A:
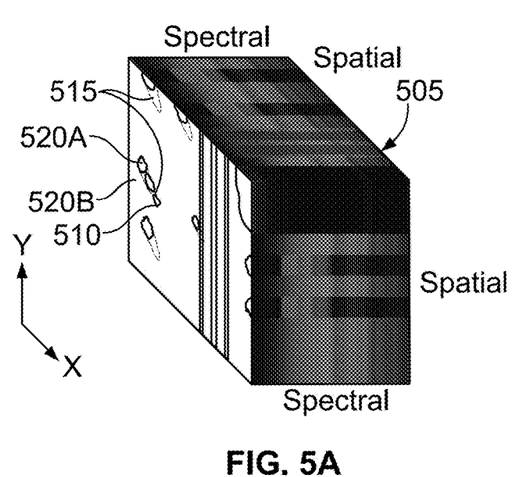
FIG. 5A shows a datacube generated by a passive hyperspectral imager.
Figure 5B:
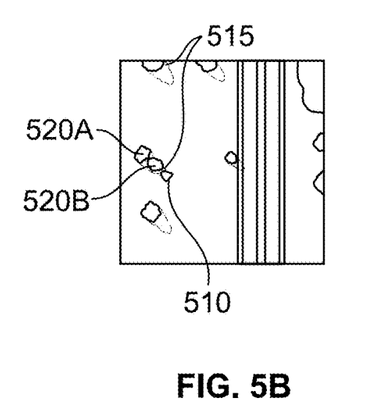
FIG. 5B shows the view perpendicular to the x-y plane of FIG. 5A.
Figure 5C:
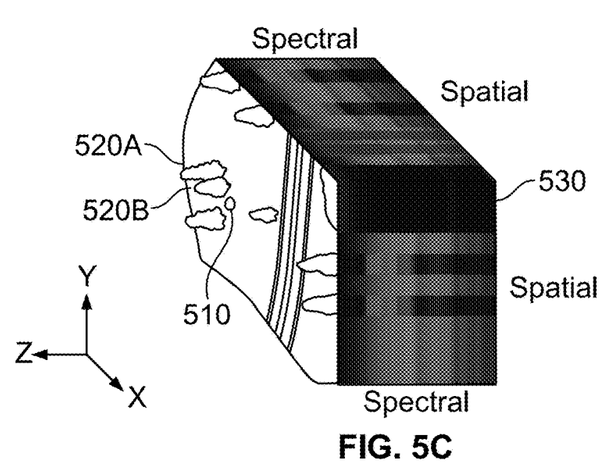
FIG. 5C shows a datacube generated by a 3D hyperspectral imaging system using a LIDAR focal plane array.

FIGS. 5A-5C illustrate the advantages of the current invention over a passive hyperspectral imager or a combined hyperspectral/LIDAR system. FIG. 5A shows a datacube generated by a passive hyperspectral imager. FIG. 5B shows the view perpendicular to the x-y plane of FIG. 5A.

As illustrated in FIG. 5A, a passive hyperspectral imager acquires a data cube 505 comprising a spatial component in the x direction, a spatial component in the y direction, and the spectral component in the z direction. A passive hyperspectral imager is unable to measure the z-spatial component of a scene. The true dimensions of a target object 110 are often lost in such 2D images as a result of the camera's viewing frustum and look angle. For example, aerial images of a tall building often make the top of a building seem wider than the bottom of the building as a result of the viewing frustum. From certain angles of observation, an object 110 may even appear distorted.

Data registration using a combined hyperspectral/LIDAR system can correct for such an effect. Such a combined system would comprise a single wavelength LIDAR system and a passive hyperspectral imager that could have a resolution that is markedly different from that of the single wavelength LIDAR system. Such a combined instrument may be able to correct for spatial distortions but will suffer from other deleterious effects such as shadowing effects. Shadowing effects cause a loss of spectral information as illustrated in FIG. 5B. As shown in FIG. 5B, a target 510 partially lies in the shadow 515 cast by two nearby trees 520A and 520B. When this occurs, the final data product of a passive hyperspectral imager or a combined hyperspectral/LIDAR system will have holes in the data cube 505—particularly in the spectral direction of the data cube 505. Also, the time of data collection for these types of instruments is often restricted to daytime between approximately 10:00 AM and 2:00 PM, when the solar zenith angle is close to normal. Such a combined hyperspectral/LIDAR system cannot perform hyperspectral foliage penetration, and currently no system on the market has such a capability FIG. 5C shows a datacube 530 generated by a 3D hyperspectral imager 200 using a LIDAR focal plane array 140. An active 3D hyperspectral imager 200, such as the one described by this invention can minimize or even eliminate most of the aforementioned problems of a passive hyperspectral imager or a combined hyperspectral/LIDAR system. Datacube 530 shows the type of data that are collected by an active 3D hyperspectral imager whose data components comprise spatial-spatial-spatial-spectral components. The terrain of the target scene 110 can now be mapped with each pixel element comprising information regarding three spatial dimensional components and the spectral reflectance information. The target 510 that was shadowed in FIGS. 5A and 5B by nearby trees 520A and 520B is now fully illuminated by the white light laser source according to embodiments of the invention. As a result, the number of holes in the data cube 530 is minimized.

A target object 110 that may be hidden underneath a canopy may also be detected using the current invention where gaps that occur naturally in canopies may be exploited by the white light laser source-providing a unique opportunity to perform hyperspectral foliage penetration. Morphological analysis of an object and of a scene can now be exploited. For example, these techniques may be used to more precisely measure the density and health of a forest for carbon sequestration measurements while at the same time improving the certainty of target identification even when the target is hidden beneath a canopy. Finally, data collection using such a system will not be restricted to any particular time of day and will be able to acquire high quality data both night and day.

Figure 6:
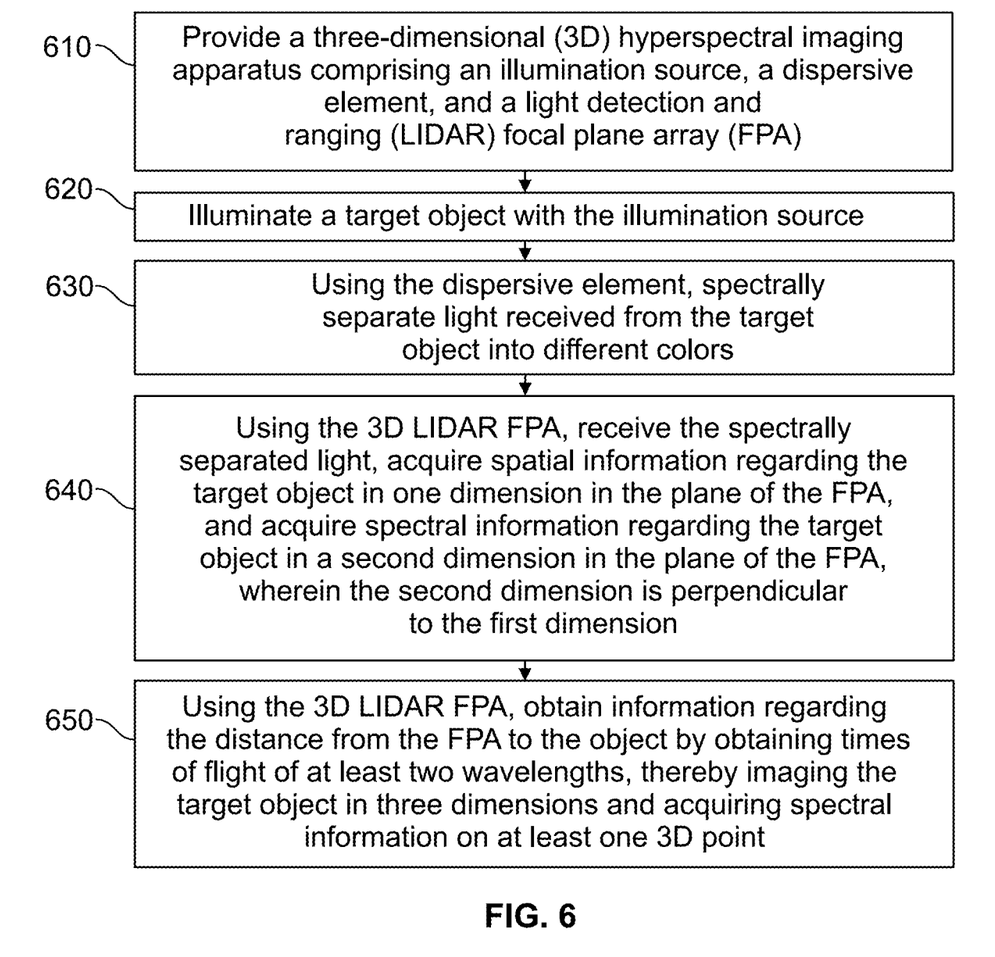
FIG. 6 is a flowchart of a method for 3D hyperspectral imaging using a LIDAR focal plane array.

FIG. 6 is a flowchart of a method 600 for three-dimensional (3D) hyperspectral imaging using a LIDAR focal plane array. The order of the steps in the method 600 is not constrained to that shown in FIG. 6 or described in the following discussion. Several of the steps could occur in a different order without affecting the final result.

In block 610, a three-dimensional (3D) hyperspectral imaging apparatus comprising an illumination source, a dispersive element, and a light detection and ranging (LIDAR) focal plane array (FPA) is provided. Block 610 then transfers control to block 620.

In block 620, a target object is illuminated with the illumination source. Block 620 then transfers control to block 630.

In block 630, using the dispersive element, light received from the target object is spectrally separated into different colors. Block 630 then transfers control to block 640.

In block 640, using the 3D LIDAR FPA, spatial information is acquired regarding the target object in one dimension in the plane of the FPA and spectral information is acquired regarding the target object in a second dimension in the plane of the FPA, wherein the second dimension is perpendicular to the first dimension. Block 640 then transfers control to block 650.

In block 650, using the 3D LIDAR FPA, information is obtained regarding the distance from the FPA to the object by obtaining times of flight of at least two wavelengths, thereby imaging the target object in three dimensions and acquiring spectral information on at least one 3D point. Block 650 then terminates the process.

Figure 7:
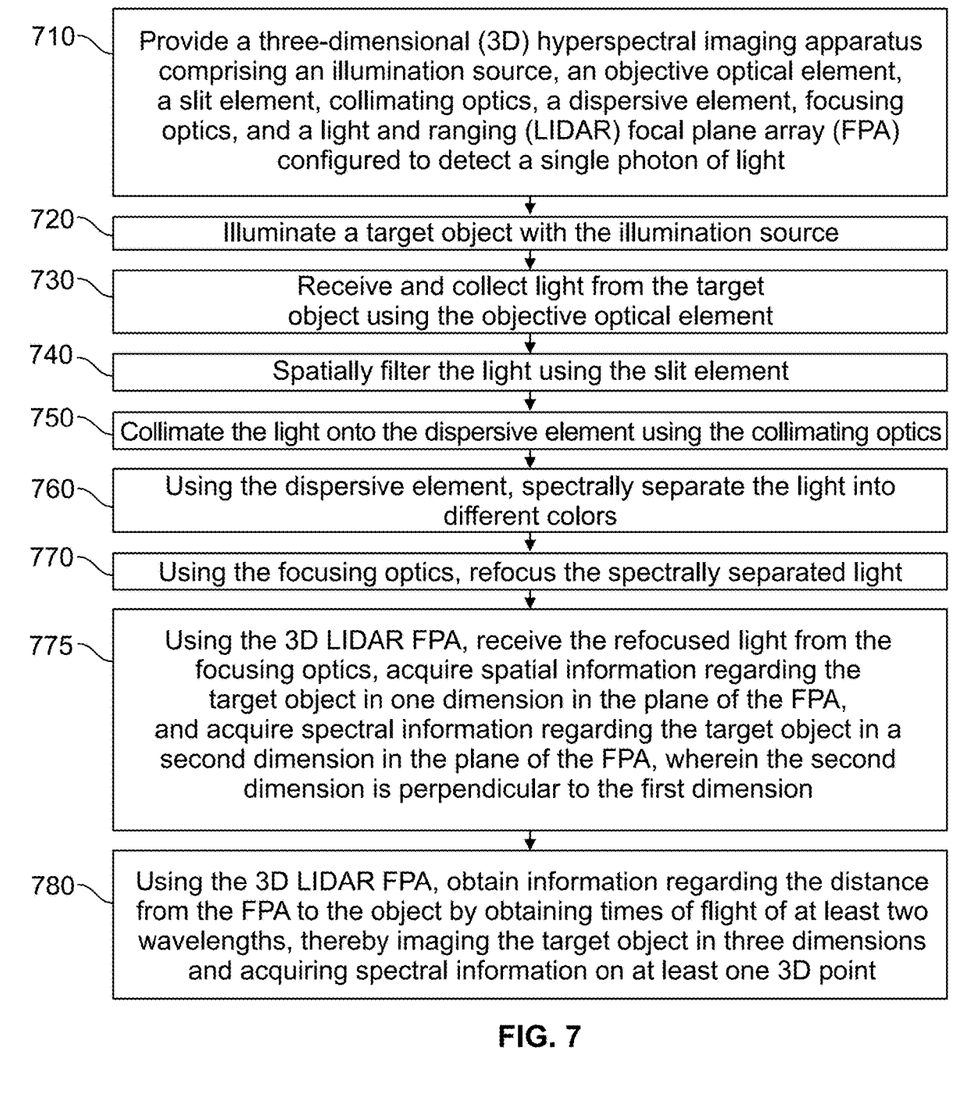
FIG. 7 is a flowchart of a method for 3D hyperspectral imaging using a LIDAR focal plane array configured to detect a single photon of light.

FIG. 7 is a flowchart of a method 700 for three-dimensional (3D) hyperspectral imaging using a LIDAR focal plane array. The order of the steps in the method 700 is not constrained to that shown in FIG. 7 or described in the following discussion. Several of the steps could occur in a different order without affecting the final result.

In block 710, a three-dimensional (3D) hyperspectral imaging apparatus comprising an illumination source, an objective optical element, a slit element, collimating optics, a dispersive element, and a light detection and ranging (LIDAR) focal plane array (FPA) configured to detect a single photon of light is provided. Block 710 then transfers control to block 720.

In block 720, a target object is illuminated with the illumination source. Block 720 then transfers control to block 730.

In block 730, light is received and collected from the object using the objective optical element. Block 730 then transfers control to block 740.

In block 740, the light is spatially filtered using the slit element. Block 740 then transfers control to block 750.

In block 750, the light is collimated onto the dispersive element using the collimating optics. Block 750 then transfers control to block 760.

In block 760, using the dispersive element, the light is spectrally separated into different colors. Block 760 then transfers control to block 770.

In block 770, using the focusing optics, the spectrally separated light is refocused. Block 770 then transfers control to block 775.

In block 775, using the 3D LIDAR FPA, the refocused light is received from the focusing optics, spatial information is acquired regarding the target object in one dimension in the plane of the FPA and spectral information is acquired regarding the target object in a second dimension in the plane of the FPA, wherein the second dimension is perpendicular to the first dimension. Block 770 then transfers control to block 780.

In block 780, using the 3D LIDAR FPA, information is obtained regarding the distance from the FPA to the object by obtaining times of flight of at least two wavelengths, thereby imaging the target object in three dimensions and acquiring spectral information on at least one 3D point. Block 780 then terminates the process.

The Geiger-mode camera has a maximum frame rate that almost matches the repetition rate of the white light source and is single photon sensitive without any range-intensity effect. The biggest drawback of using the Geiger-mode camera is the non-proportional gain of the detectors. The Geiger-mode camera operates by detecting a single event per laser pulse. Events are recorded in time without any amplitude information of the return signal. Thus the gain for the detectors is not linear. To produce a hyperspectral image, it is necessary to take multiple laser flashes of data to build up a histogram to determine the spectral reflectivity of a target. Intensity information gather by a Geiger-mode detector is complicated by its non-linearity. A much better detector to use is the intensified photodiode that has single-photon sensitivity and proportional gain and high dynamic range in photon counts/second.

By replacing with a single device a suite of instruments required to gather both hyperspectral and 3D images, embodiments of the invention may reduce the number of instruments flown on environmental monitoring missions. Accordingly, embodiments of the invention may reduce the size, weight, and power of the required instrumentation by replacing the suite of instruments with a single device capable of producing even more comprehensive data products.

There are several advantages that can apply to using a 3D LIDAR FPA to construct a hyperspectral 3D LIDAR system. When compared to a suite of instruments to gather both hyperspectral and 3D images, the active 3D hyperspectral imager will reduce the number of instruments thus reducing the size, weight, and power by replacing the suite of instrument with a single instrument. In addition, using a single instrument that simultaneously collect different types of data product would produce better coordinated results and reduce post-processing efforts.

A further advantage can be that an active 3D hyperspectral imager removes the complications of data fusion, spectrally and spatially resolving a target in three dimensions, and providing fast turn-around data sets that have absolute simultaneity and exact perspective of the objects for both types of data.

Another advantage can be that according to embodiments of the invention, high spatial coverage may be achieved with simultaneous detection of over 100 different wavelengths.

Additionally, a still further advantage is that it may be possible to perform chemical analysis of the return signal. The results can then be used to map a chemical plume of the target object.

Embodiments of the invention can measure the spectral reflectance of a target on collected 3D points.

Embodiments of the invention may probe objects hidden beneath canopies. Embodiments of the invention may measure the spectral reflectance of an object hidden, for example, beneath a tree, thereby providing a method to perform hyperspectral foliage penetration.

Embodiments of the invention that simultaneously collect different types of data may produce better coordinated results and may reduce the time delays, expense, and trouble associated with the required post-processing time.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims. It is intended, therefore, that the subject matter in the above description shall be interpreted as illustrative and shall not be interpreted in a limiting sense. The invention is defined by the following claims.

I claim:

1. A system, comprising:
   an illumination source configured to illuminate a target object using broadband laser light;
   a dispersive element configured to spectrally separate light received from the target object into different colors; and
   a focal plane array (FPA) configured to receive the light from the dispersive element, configured to acquire spatial information regarding the target object in one dimension in the plane of the FPA, configured to acquire spectral information in a second dimension in the plane of the FPA, wherein the second dimension is perpendicular to the first dimension, configured to obtain information regarding the distance from the FPA to the target object by obtaining different times of flight of at least two wavelengths, and configured to detect a single photon of light, thereby hyperspectrally imaging the target object in three dimensions.

2. The system of claim 1, further comprising an objective optical element, the objective optical element being configured to receive light from the target object and to collect the light.

3. The system of claim 1, further comprising a slit element configured to spatially filter the light.

4. The system of claim 3, wherein the slit element is further configured to spatially filter the light so as to define a spatial line in the spatial dimension of the FPA.

5. The system of claim 1, further comprising focusing optics configured to refocus the light onto the FPA.

6. The system of claim 1, further comprising collimating optics configured to collimate the light.

7. The system of claim 1, wherein the FPA samples the return signal at a selected sampling time interval.

8. The system of claim 1, wherein the system operates in push-broom mode.

9. The system of claim 1, wherein the system operates in whisk-broom mode.

10. The system of claim 1, wherein the illumination source comprises a wide spectral bandwidth laser.

11. The system of claim 1, wherein the illumination source is spatially reformatted into a line.

12. The system of claim 11, wherein the line is closely matched to the field of view of the FPA so as to optimize performance.

13. The system of claim 1, wherein the system is configured to measure spectral information regarding the target object.

14. The system of claim 1, further comprising an objective optical element, the objective optical element being configured to receive light from the target object and to collect the light.

15. The system of claim 1, wherein the system is configured to measure an excited state lifetime of the target object following illumination.

16. The system of claim 1, wherein the system is configured to remove shadowing effects and to reduce data holes in a hyperspectral data cube.

17. The system of claim 1, wherein at least two detections are performed, and wherein the at least two detections are used to construct a histogram representing the spectral reflectivity of the target object.

\* \* \* \* \*